United States Patent Office
3,410,155
Patented Nov. 12, 1968

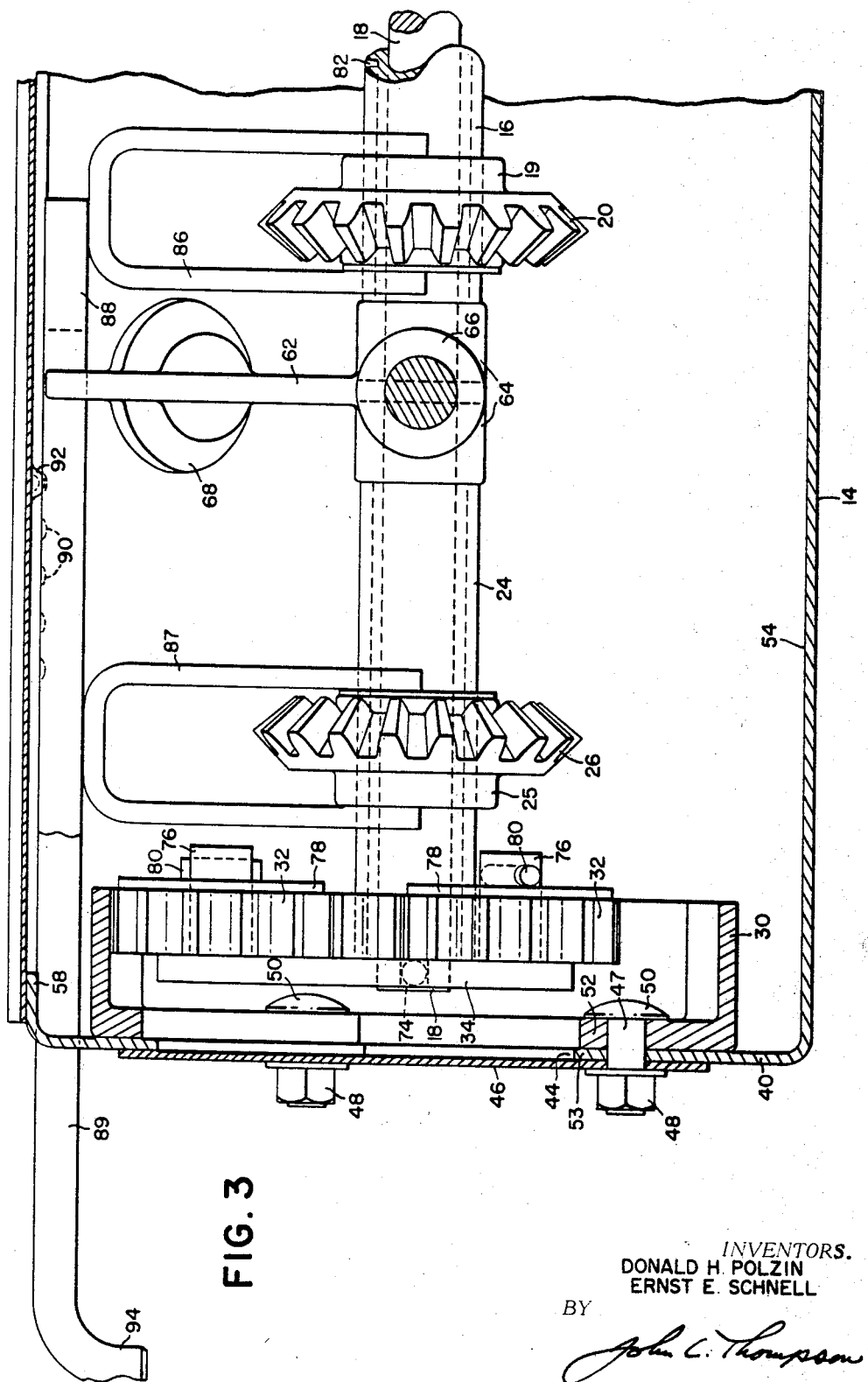

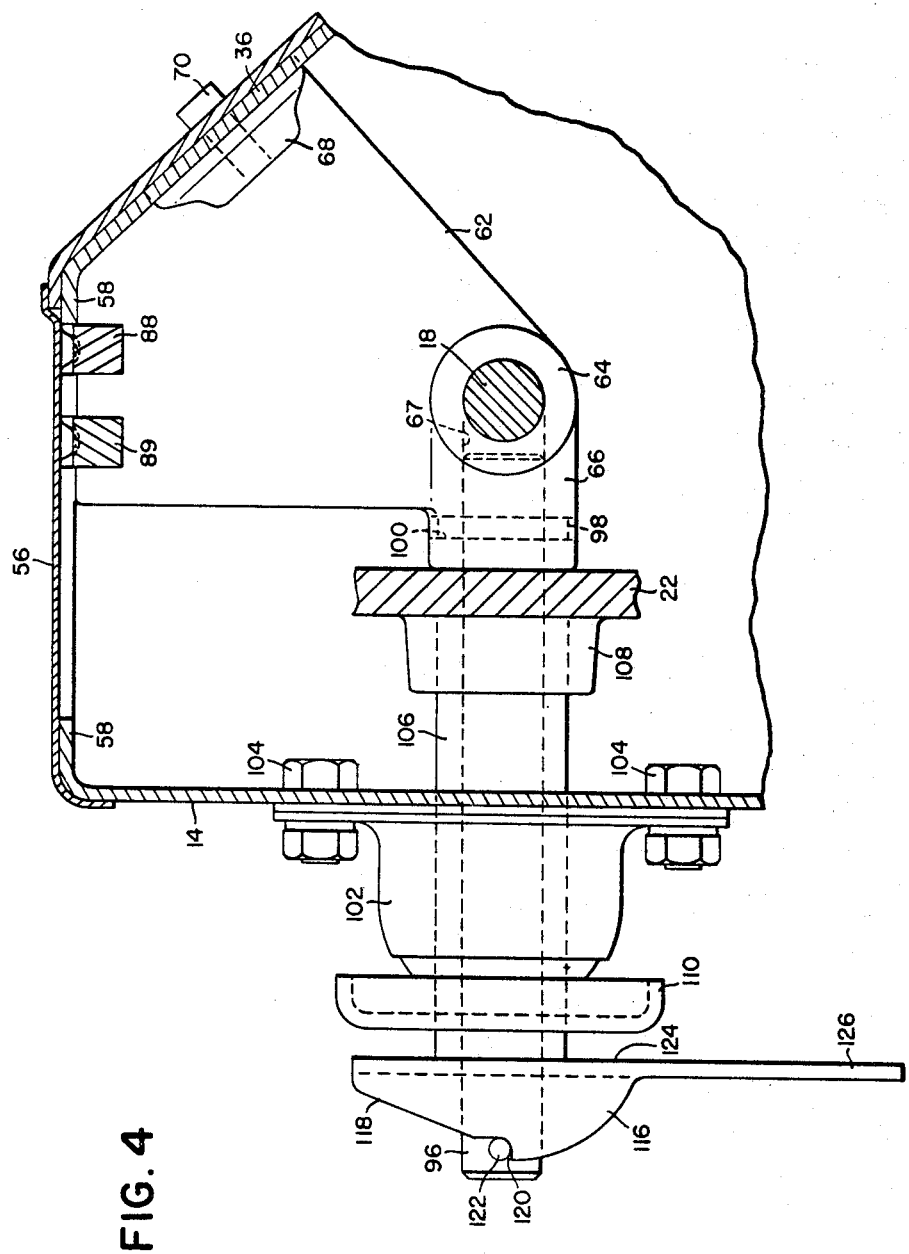

3,410,155
VARIABLE SPEED DRIVE MECHANISM
Donald Herman Polzin, Horicon, and Ernst Emil Schnell, West Bend, Wis., assignors to Deere & Company, Moline, Ill., a corporation of Delaware
Filed May 29, 1967, Ser. No. 641,863
4 Claims. (Cl. 74—740)

ABSTRACT OF THE DISCLOSURE

A drive having coaxial input and final output shafts, the hollow input shaft being connected to a gear set having a variable speed intermediate output shaft which is in coaxial alignment with the input shaft, the intermediate output shaft in turn being connected to a planetary gear set that drives the final output shaft at a reduced speed.

Background of the invention

The present invention relates generally to variable speed drive mechanisms for grain drills, fertilizer distributors, or the like and more particularly to variable speed mechanisms of the type having axially shiftable input and output pinions that cooperate with a compound gear having a plurality of annular rows of teeth which can selectively engage the teeth on the aforementioned pinions. More particularly, this invention relates to a variable speed drive mechanism of the type shown in U.S. Letters Patent 2,085,182 in which the input and output shafts are disposed upon the same side of the housing and are coaxial with each other.

In some forms of grain drills and fetrilizer distributors, it is customary to drive the distributing mechanism at varying speeds to distribute the material at varying rates. For example, when driving the fertilizer distributor of the type shown in U.S. Letters Patent 3,252,629 the greater the speed at which the mechanism is caused to be rotated, the more material will be distributed. It is customary to drive these mechanisms from the ground wheel of the grain drill. Thus, as the forward speed of the machine is increased, more material will be distributed and an equal amount will be distributed upon the unit area covered. However, it is frequently desirable to increase the quantities distributed per unit area and to this end various speed change mechanisms have been developed. One such form is shown in U.S. Pat. No. 2,085,182. While this type has been generally satisfactory, it does have the disadvantages in that the output speed of the speed change mechanism must be reduced before driving the material distributor, and also since the input and output sides of the mechanism are on opposite ends thus making it necessary to provide additional structure to drive the mechanism.

It is an object of this invention to provide, in a variable speed mechanism of the type having input and output pinions and a compound gear, a planetary gear set having a fixed ring gear and a sun gear driven by the output pinion, the planet gears of the planetary gear set being connected in turn to a carrier which drives an output shaft at a reduced speed.

It is another object of the present invention to provide, for a variable speed mechanism of the type having a movable compound gear, novel mechanism suitable for holding the compound gear in its engaged position.

These and other objects and advantages of this invention will be apparent to those skilled in the art after a consideration of the following detailed description, taken in conjunction with the accompanying drawings in which the preferred form of this invention is illustrated.

FIG. 3 is a view taken along the lines 3—3 of FIG. 1.

FIG. 4 is a view taken along the lines 4—4 of FIG. 1 showing the mechanism by which the compound gear is shifted between engaged and disengaged positions.

In the following description right-hand and left-hand reference is determined by reference to FIGS. 1 and 3.

Figure 1:
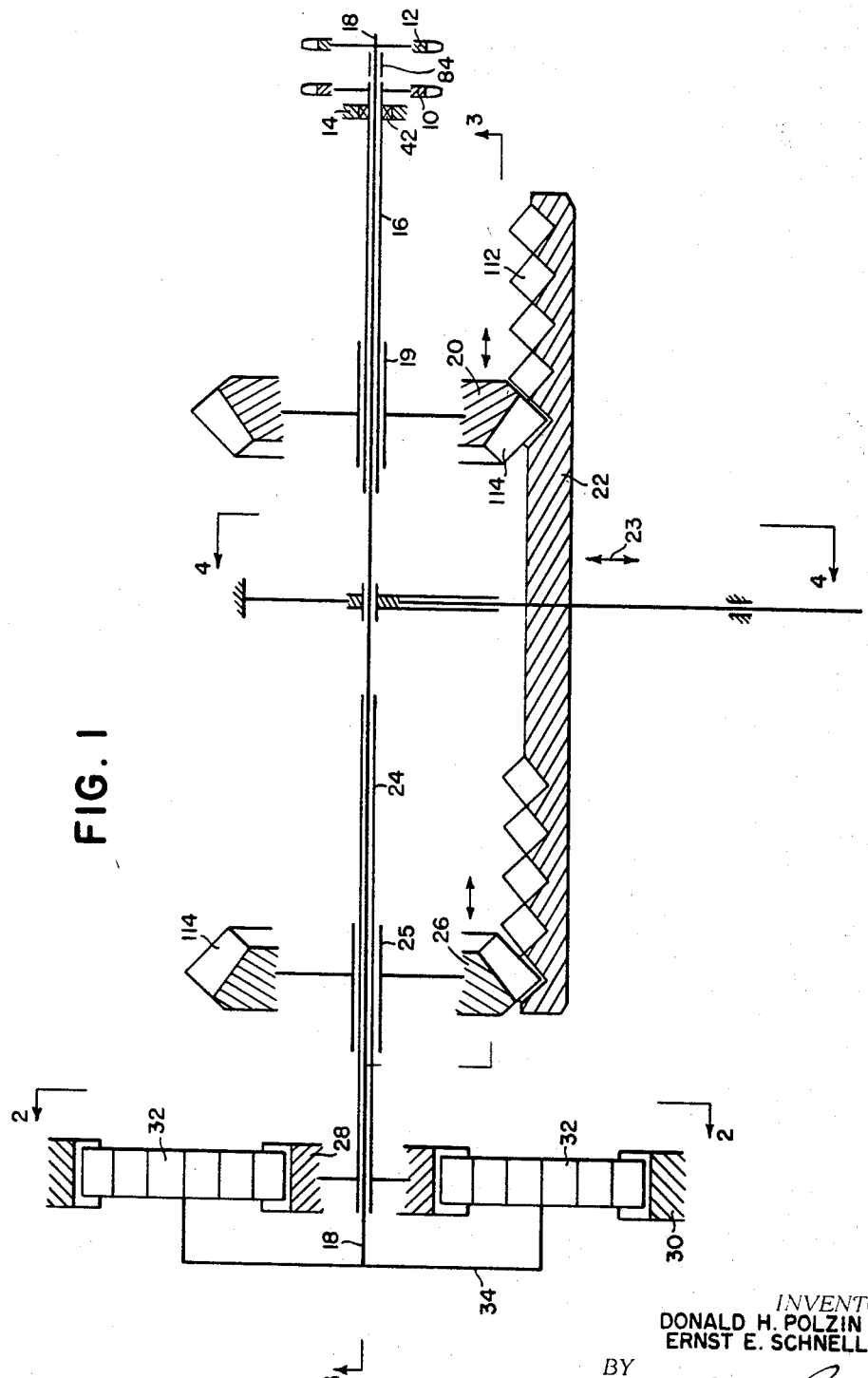
FIG. 1 is a schematic view of the variable speed mechanism of this invention.

Referring first to FIG. 1, the variable speed drive mechanism of this invention has an input sprocket 10 and an output sprocket 12. These two sprockets are disposed on the outside of the gear case 14 and are mounted on coaxial input and final output shafts 16 and 18, respectively. The input shaft is hollow and the output shaft 18 extends through the input shaft. The hub 19 of pinion gear 20 is shiftably, non-rotatably mounted on the input shaft 16. A compound gear 22 having five annular rows of teeth is mounted within the housing 14 for fore-and-aft movement as indicated by the arrow 23, and the pinion gear 20 may selectively engage one or another of the various rows of teeth on the compound gear 22 to drive the gear in one direction. A hollow intermediate output or drive shaft 24, similar to the input shaft 16, is mounted within the housing, the shaft 24 being rotatably disposed about the input shaft 16. The hub 25 of output pinion 26 is slidably non-rotatably mounted on shaft 24, the output pinion 26 selectively engaging various of the rows of teeth on the compound gear 22 to be driven thereby. Sliding movement of the pinion gears is possible when the compound gear is mounted in its rear disengaged position.

A sun gear 28 is slidably keyed to the shaft 24 and rotates therewith. A ring gear 30 is fixedly carried by the gear case 14. Planetary gears 32 are disposed between the fixed ring gear 30 and the sun gear 28, the planetary gears being carried by a carrier 34 which is in turn connected to the final output shaft 18.

As can be seen from FIG. 1, the variable change speed mechanism 20, 22, 26 will cause the initial input speed to be varied depending upon the position of the pinions 20, 26. The planetary gear set 28, 30, 32 will in turn reduce the output speed at a fixed rate as is well known in the art.

Figure 2:
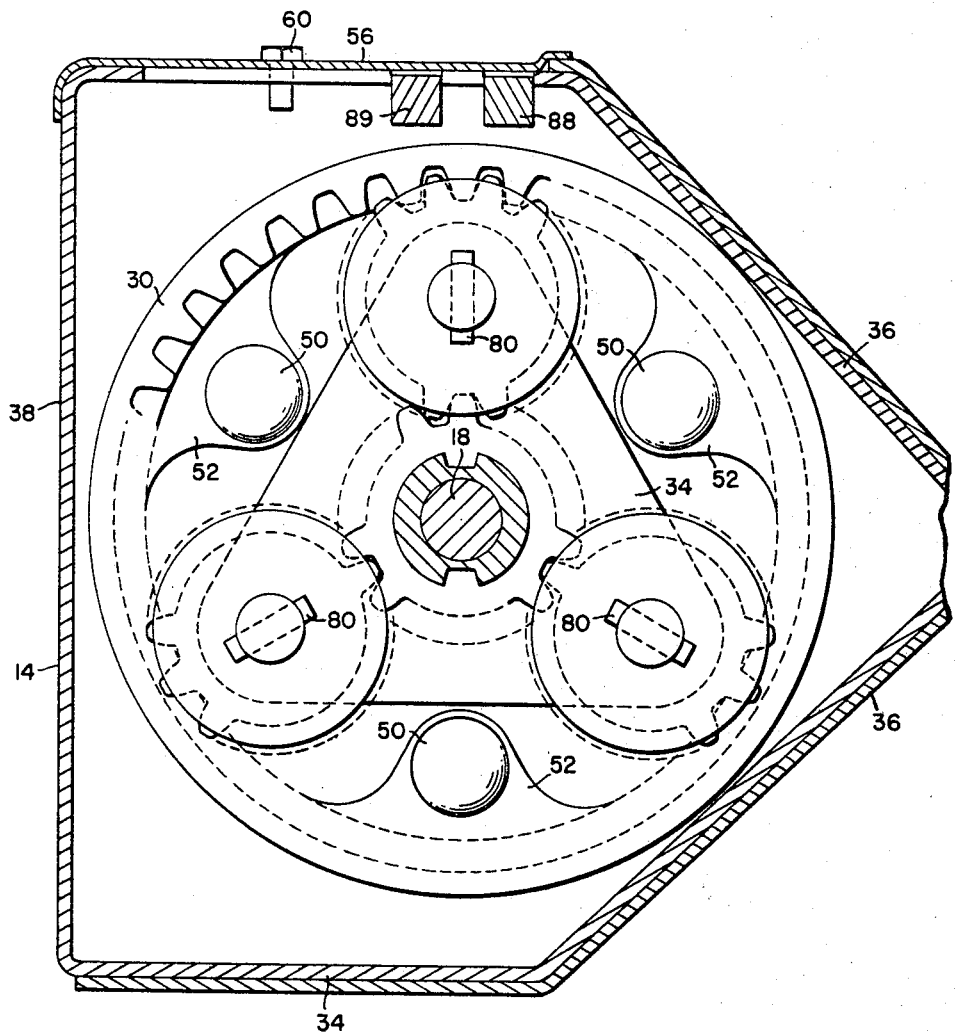
FIG. 2 is a view taken along the lines 2—2 of FIG. 1 showing a planetary gear set by which a speed reduction is effected.

Referring now more particularly to FIGS. 2, 3 and 4, the gear case 14 has front and rear side walls 36, 38 respectively, right and left side walls 40, the right side wall being provided with a bearing 42 (FIG. 1) which rotatably receives the input shaft 16. The left side wall is provided with a large triangularly shaped aperture 44. The ring gear 30 is secured to the left side wall about the aperture, and a cover plate 46 is disposed over the aperture. The cover plate 46 and ring gear 30 are secured to the end wall by bolts 47 and nuts 48, the bolts passing through aligned apertures in the cover plate 46, side walls 53 along the triangular aperture 44, and inwardly extending portions 52 of the ring gear 30, the head end 50 of the bolt contacting the ring gear. The cover plate 46 may be removed for servicing the gears within the gear case 14, and particularly the planetary gear set. In this respect it should be noted that the triangular hole 44 is slightly bigger than the triangular carrier 34. The housing is also provided with a bottom 54 and a cover plate 56 that is secured to inwardly projecting top portions 58 (FIGS. 3 and 4) by means of fasteners 60 (FIG. 2).

Secured to an intermediate portion of the back wall 36 is a spindle bearing assembly 62 having a transversely extending bearing 64 which rotatably receives the final output shaft 18. A fore-and-aft extending portion 66 having an aperture 67 is also provided in the assembly 62. The forward portion of the spindle bearing assembly 62 is provided with an enlarged abutment surface 68 which receives a suitable fastener 70 to hold the assembly 62 in place.

The planet gear carrier 34 is disposed about the final output shaft 18 and is non-rotatably secured thereto by a transversely extending roll pin 74 (FIG. 3) which is disposed in the left-hand end of shaft 18. The ends of the roll pins 74 extend outwardly beyond the sides of the output shaft 18 and engaged slots on the left-hand side of the carrier to cause the shaft 18 to rotate with the carrier. The carrier is also provided with shaft portions 76 about which are disposed the planet gears 32. A roll pin 80 is disposed within an aperture in th end of each of the shafts 76 and bears against a washer 78 to hold the planet gears 32 on the shafts 76.

Movement of the carrier 34 in a right-hand direction on the shaft 18 is prevented by sleeve 24, the inner or right-hand surface of the carrier 34 abutting the left-hand end of the sleeve 24, the right-hand end of sleeve 24 abutting the transverse bearing 64. Left-hand movement of the carrier 34 is prevented by washers 78 which overlap the teeth of the internal gear 30. The sun gear is held against right- or left-hand movement by the washers 78 and the carrier 34.

Disposed over the right-hand side of the final output shaft 18 is the hollow input shaft 16, the right-hand end of the shaft 16 passing through the bearing portion 42 of the gear case 14 and carrying the input sprocket 10, the left-hand end abutting against the spindle bearing assembly 62. Both the input shaft 16 and the drive shaft 24 are splined, as at 82 and the hub portion of each of the pinions 20, 26 are slidably keyed thereon. The output sprocket 12 is fixed to the shaft 18 and spacer means 84 (FIG. 1) prevent it from shifting towards the input sprocket 10.

Yokes 86, 87 are disposed to either side of the hubs 19, 25, to move pinions 20, 26, the yokes 86, 87 in turn being secured as by welding to shifter bars 88, 89. Each shifter bar is provided with notches 90 that cooperate with detent means 92 formed on the top of the cover plate 56. Thus, each shifter bar and its associated yoke 86 may be moved to selected positions of adjustment simply by engaging the handle portion 94 of the shifter bar 88 and moving it to the desired position. Indicia means (not shown) are provided on the top of each shifter bar to show the operator its position of adjustment. It should be noted also that the spindle bearing assembly 62 is provided with cut out portions (no number) which receive the shifter bars 88 and 89.

As previously mentioned, the spindle bearing assembly 62 is provided with a fore-and-aft extending aperture 67. Disposed within this aperture 67 is the forward end of a shaft 96 whose rear end is disposed outside of the gear case 14. Pin means 98 are disposed within a transverse aperture 100 in the portion 66 and secure the shaft 96 against longitudinal movement. An intermediate portion of the shaft 96 passes through a bearing assembly 102 that is secured by conventional fasteners 104 to the rear wall of the gear case 14. A sleeve 106 is slidably disposed about the shaft 96 and also within the bearing 102 and has secured to it at its forward end the hub portion 108 of the compound gear 22. Manually engageable means 110 are secured to the rear end of the sleeve 106 to provide means whereby the compound gear can be moved from a forward position, in which its gear teeth 112 (FIG. 1) are in engagement with the gear teeth 114 of the pinions 20 and 26, to a rearward position where the teeth 112 and 114 are not in engagement with each other. A lever and cam assembly is provided to normally hold the compound gear 22 in its engaged position but which will permit the compound gear to be moved to its rear disengaged position. This structure includes an apertured member 116 which is rotatably disposed about the rear end of the shaft 96, the member having a cam portion 118 and a stop 120, both of which are engageable with radially outwardly extending abutment means 122 carried by the shaft 96. The forward side 124 of the member 116 contacts the rear end of the sleeve 106, and the assembly 116 is also provided with a handle portion 126 which normally hangs below the shaft 96.

The parts are so arranged and constructed that the compound gear will normally be caused to rotate in a counterclockwise direction when viewed from the rear. To hold the compound gear 22 in engagement the member 116 is positioned so that the stop member 120 will engage the outwardly extending abutment 122. In this position the member 116 is contacted by the rear end of the sleeve 106 and the rotational movement of the compound gear will cause the stop 120 to further engage the abutment 122. Accidental or inadvertent rotation of the assembly 116 is prevented by the handle portion 126 which is disposed in its lowermost position when the gears are in engagement. Inadvertent rotation is unlikely due to the forces of gravity which bias the handle to its lowest position.

In the assembly described above the speed reduction means is disposed in the drive train after the variable change speed mechanism. The purpose of this is so that the bevel gears on the compound gear will not have to bear as great a torque load as they would if the speed were reduced prior to the variable change speed mechanism.

While the preferred structure in which the principles of the present invention have been incorporated is shown and described above, it is to be understood that the invention is not to be limited to the particular details, shown and described above, but that, in fact, widely different means may be employed in the practice of the broader aspects of the invention.

What is claimed is:

1. A variable speed drive mechanism for grain drills and the like comprising: a variable change speed mechanism having a hollow input shaft, a first pinion slidably non-rotatably mounted on said input shaft, a compound gear movable towards and away from said input shaft between engaged and disengaged positions, said compound gear having a plurality of annular rows of gear teeth on one face selectively engageable with the gear teeth on said first pinion, a hollow drive shaft in coaxial alignment with the input shaft, and a second pinion non-rotatably mounted on said drive shaft, the teeth on said second pinion being selectively engageable with said rows of teeth on said compound gear; and speed reduction means having an input gear driven by said drive shaft and an output shaft extending through said hollow input and drive shafts.

2. The variable speed drive mechanism set forth in claim 1 in which said speed reduction means comprises a planetary gear set disposed in coaxial alignment with said hollow input and drive shafts, said gear set including a ring gear, a plurality of planet gears disposed within said ring gear, and a sun gear, said sun gear being mounted on and driven by said drive shaft.

3. The vavriable speed drive mechanism set forth in claim 2 in which said ring gear is fixed and said planetary gears are carried by a carrier which in turn is non-rotatably secured to the rotatable output shaft.

4. A variable speed drive mechanism for grain drills and the like comprising: a gear case having an aperture in its rear wall, a shaft passing through said aperture and interconnected with said gear case, said shaft having radially outwardly extending abutment means on a portion outside of the gear case, a sleeve disposed about said shaft and passing through said aperture, said sleeve carrying a compound gear at its forward end and having manually engageable means on that portion disposed to the rear of the gear case whereby said compound gear can be manually moved between forward engaged and rear disengaged positions, a drive and a driven pinion disposed within said gear case, said drive pinion causing the compound gear and sleeve to rotate in one direction when the compound gear is in its forward engaged position, the compound gear in turn driving the driven pinion, and a lever having one end rotatably disposed about said shaft between said sleeve and the outwardly extending abutment means, the other end of said lever serving as a handle portion, said one end being provided with a cam surface and stop means engageable with said abutment means, the parts being so arranged and constructed that when one end of the cam surface and the stop means are in engagement with the abutment means the handle portion is disposed below the shaft and the compound gear is forced into engagement with the pinions, the rotation of the shaft in said one direction forcing said stop means into engagement with said abutment means, and when the other end of the cam surface is in engagement with the abutment means the compound gear may be manually moved to a rear disengaged position.

References Cited

UNITED STATES PATENTS

| 724,312 | 3/1903 | Miller | 74—347 |
| 2,085,182 | 6/1937 | Braley et al. | 74—347 |
| 3,096,666 | 7/1963 | Christenson et al. | 74—785 X |
| 3,339,432 | 9/1967 | Hungerford | 74—740 X |

ARTHUR T. McKEON, *Primary Examiner.*